Patented Aug. 10, 1954

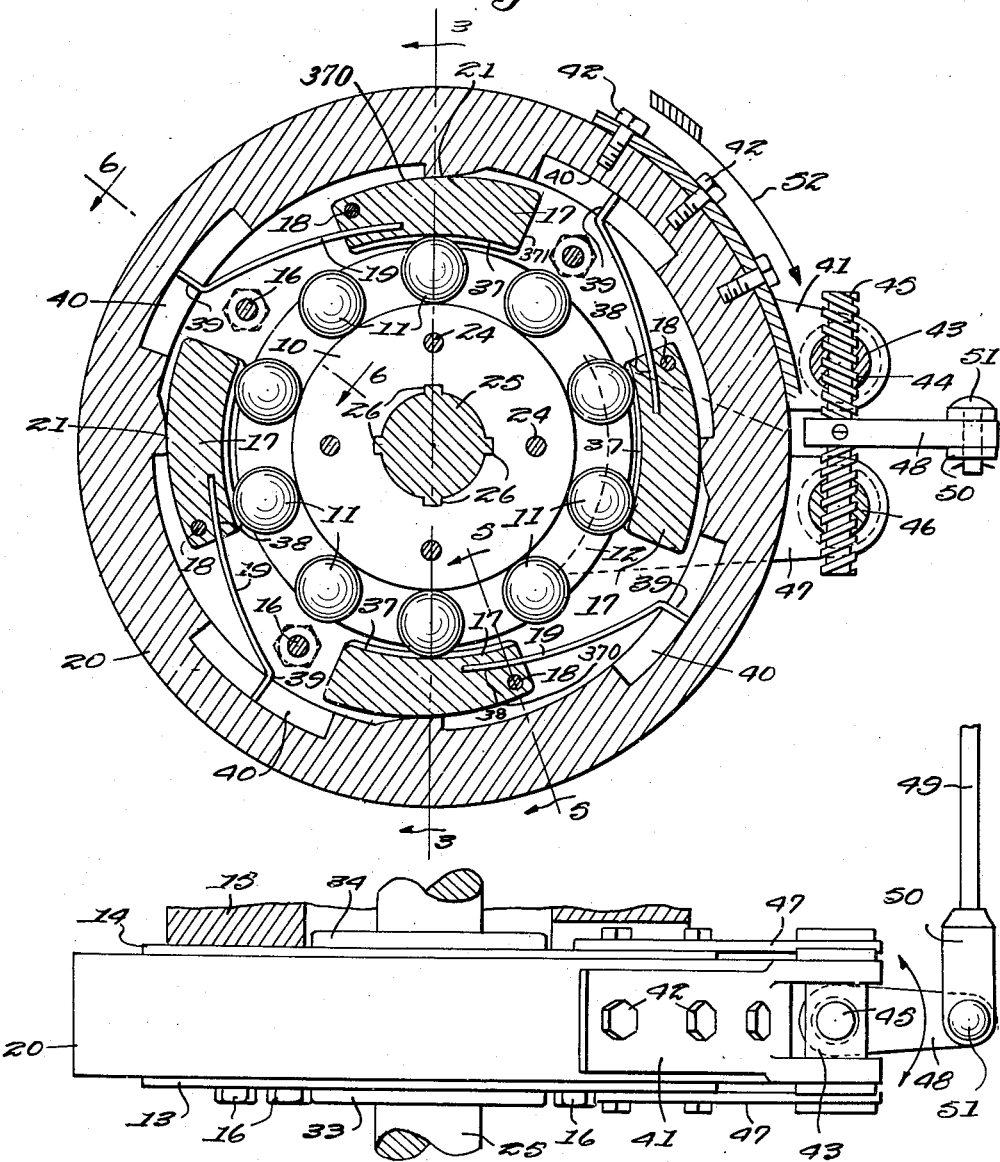

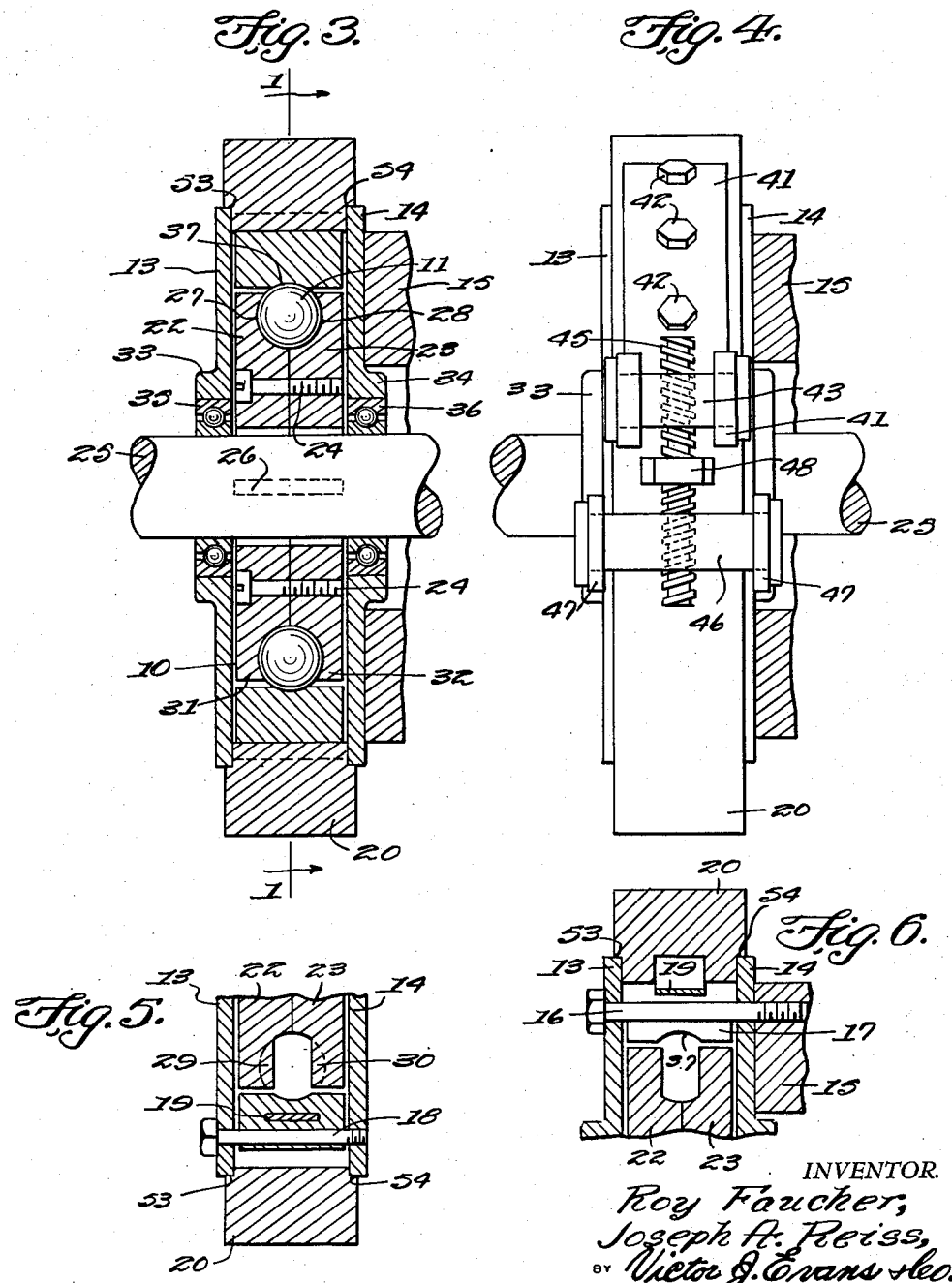

2,685,944

UNITED STATES PATENT OFFICE 2,685,944

BALL-BEARING BRAKE

Roy Faucher, Porterville, and Joseph A. Reiss, Fresno, Calif., assignors of one-third to James Herman Reiss, Fresno, Calif.

Application October 9, 1950, Serial No. 189,256

5 Claims. (Cl. 188—74)

This invention relates to brakes of the clutch actuated type in which a core is keyed to a shaft and the brake housing is fixed, and in particular a brake having a core with a continuous annular channel and shoes pivotally mounted between side plates are urged into engagement with balls in the channel of the core by cams on the inner surface of an outer ring wherein with the side plates held stationary the ring is rotated to urge the shoes against the balls and the contact of the balls with the shoes retards rotation of a shaft upon which the core is positioned.

The purpose of this invention is to provide a brake which in the free running position is substantially frictionless, the holding elements thereof being disengaged.

In the conventional type of friction brake or clutch the continuous rubbing of engaging elements, even in the free position causes a certain amount of draw which retards rotation of a shaft, particularly at high speed. It is difficult to release the elements of a brake completely so that the elements are disengaged in the free running position. With this thought in mind this invention contemplates a plurality of spaced balls mounted in an annular channel in the surface of a core or rotor with shoes pivotally mounted in fixed side plates and positioned to be engaged by the balls, with the shoes resiliently held away from the balls in the free running position and with the shoes urged into engagement with the balls, as the brake is applied, by cams on the inner surface of a surrounding ring.

The objects of this invention is, therefore, to provide means for constructing a brake whereby engaging elements of the stationary and rotating parts are completely disengaged when the brake is released.

Another object of the invention is to provide means for forming a brake wherein brake shoes are resiliently urged outwardly away from an inner rotating member with the parts in the free running position and wherein the shoes are forced inwardly when it is desired to apply the brake.

A further object of the invention is to provide a brake in which the engaging elements are spaced apart in the free running position of the brake and urged into gripping relation as the brake is applied, which is of a comparatively simple and economical construction.

With these and other objects and advantages in view the invention embodies a brake having a rotor with a plurality of balls embedded in the peripheral surface with shoes having arcuate inner surfaces pivotally mounted in fixed elements and resiliently held away from the balls and with cams carried by an outer ring positioned to contact the shoes for urging the shoes into gripping relation with the balls.

Other features and advantages of the invention will appear from the following description taken in connection with the drawings wherein:

Figure 1 is a cross section through the brake taken on line 1—1 of Figure 3.

Figure 2 is a plan view of the brake showing the parts assembled.

Figure 3 is a longitudinal section through the brake taken on line 3—3 of Figure 1.

Figure 4 is an end elevational view of the brake looking toward the brake adjusting elements.

Figure 5 is a detail taken on line 5—5 of Figure 1 showing a section through the pivotal mounting of the shoes of the brake.

Figure 6 is a detail showing a section taken on line 6—6 of Figure 1 illustrating the means for bolting the side plates to a fixed member.

Referring now to the drawings wherein like reference characters denote corresponding parts the improved brake of this invention includes a center member or rotor 10 having balls 11 in an annular channel 12, side plates 13 and 14, attached to a fixed member 15 by bolts 16, shoes 17 pivotally mounted between the plates 13 and 14 by pins 18 and resiliently held away from the balls by springs 19, and an outer ring 20 having cam surfaces 21 on the inner surface thereof.

The rotor 10 which is formed of two complementary sections 22 and 23, bolted together by bolts 24 is keyed to a shaft 25 by keys 26, as shown in Figure 1. The sections 22 and 23 of the rotor are provided with annular ball races 27 and 28, which form the channel 12 and the races are provided with projections 29 and 30, respectively, that are positioned between the balls 11 to retain the balls in spaced relation. The outer edges of the sections 22 and 23 extend over the races 27 and 28 providing lips 31 and 32 that prevent the balls being thrown outwardly by centrifugal motion.

The side plates 13 and 14 are fixedly mounted, being bolted to a stationary member 15 by the bolts 16 and the shaft 25 is journaled in hubs 33 and 34 of the side plates by bearings 35 and 36, respectively.

The shoes 17 are provided with arcuate inner surfaces 37 to receive the balls 11 and the ends are provided with openings 38 into which the ends of the springs 19 extend and with the opposite ends 39 of the springs slidably held in recesses 40 in the outer ring 20 the shoes are resiliently urged away from the balls with the brake in the free running position. The outer surface 370 of each shoe 17 is also of arcuate formation, but the outer surface 370 is not parallel to the inner surface 37 since it extends in a greater arc to provide a wider end 371. The ends 371 of the shoes 37 being wider provides a wedging action in coaction with the cams 21, thus more firmly forcing the ends 371 into engagement with the balls 11. The wedging action of the end 371 of the shoes thus provides a positive binding action on the balls to provide a more positive braking action.

A bracket 41 is attached to the outer surface of the ring 20 by bolts 42 and a pin 43, extended through the bracket is provided with a threaded opening 44 through which a threaded stud 45 extends, as shown in Figure 1. The opposite end of the stud is provided with oppositely disposed threads, the threads on one end being right hand and those on the other being left hand, and this end of the stud is threaded through a pin 46 in brackets 47 which are mounted on or extend outwardly from side plates 13 and 14. The pin 46 is mounted in the outer ends of the brackets 47.

The stud 45 is actuated by an arm 48 through a rod 49 which is provided with a clevis 50 that is pivotally connected to the arm 48 by a pin 51.

The outer ring 20 is provided with annular recesses 53 and 54 that receive the inner edges of the side plates 13 and 14 and, as illustrated in Figure 3 the outer ring is free to rotate on the side plates.

With the parts arranged in this manner the brake will operate in one direction to apply the brakes and in the opposite direction to release the brakes. To apply a braking action the rod 49 is pulled forward in the conventional manner by the operation of a foot pedal or hand lever. The movement of the rod 49 will cause the rotation of the threaded stud 45 to draw the pin 43 mounted on the outer ring 20 toward the stationary pin 46. Thus by rotating the ring 20 in this direction, the direction being indicated by the arrow 52, the cams 21 will move over the surfaces of the shoes 17 whereby ends 371 of the shoes are urged inwardly on their respective pivots 18 into contact with the outer surfaces of the balls 11. Continued movement of the ring 20 causes the wider ends 371 of the shoes to create a wedging action to grip the balls whereby the parts are held stationary and rotation of the shaft 25 is stopped.

It will be understood that modifications may be made in the design and arrangement of the parts without departing from the spirit of the invention.

What is claimed is:

1. A brake comprising a rotor fixedly mounted on a shaft, stationary side plates journaled on the shaft and positioned on opposite sides of the rotor, balls freely mounted in the peripheral surface of the rotor, shoes having arcuate inner ball engaging surfaces pivotally mounted in the side plates, resilient means holding the shoes away from the balls, an outer ring having cam surfaces thereon extending around the rotor and positioned with the cam surfaces in engagement with the shoes, and means actuating the said outer ring whereby the cam surfaces urge the shoes into engagement with the balls.

2. A brake comprising a rotor fixedly mounted on a shaft, stationary side plates journaled on the shaft and positioned on opposite sides of the rotor, balls freely mounted in the peripheral surface of the rotor, shoes having arcuate inner ball engaging surfaces pivotally mounted in the side plates, resilient means holding the shoes away from the balls, an outer ring having cam surfaces thereon extending around the rotor and positioned with the cam surfaces in engagement with the shoes, coacting brackets positioned on the side plates and outer ring having transversely disposed pins extended therethrough, a stud having right and left hand threads thereon threaded through the pins of the brackets, and an arm for turning the studs to actuate the outer ring for moving the cam surfaces over the shoes to bring the shoes into holding relation with the balls.

3. In a brake, the combination which comprises a rotor having a peripheral channel therein, balls positioned in said channel, stationary side plates positioned against the sides of the rotor, shoes having arcuate inner surfaces pivotally mounted in the side plates and positioned to engage the balls of the rotor, springs resiliently urging the shoes away from the balls, an outer ring with cams on the inner surface freely mounted between the side plates with the cams on the inner surface positioned to engage the outer surfaces of the shoes, and means actuating the outer ring whereby the cams urge the shoes into gripping relation with the balls of the rotor.

4. In a brake, the combination which comprises a rotor having a peripheral channel therein, balls positioned in said channel, stationary side plates positioned against the sides of the rotor, shoes having arcuate inner surfaces pivotally mounted in the side plates and positioned to engage the balls of the rotor, springs resiliently urging the shoes away from the balls, an outer ring with cams on the inner surface freely mounted between the side plates with the cams on the inner surface positioned to engage the outer surfaces of the shoes, brackets extended outwardly from the side plates, a pin carried by the outer ends of the brackets of the side plates, a bracket positioned on the outer ring, a pin carried by the bracket of the outer ring and positioned to coact with the pin carried by the brackets of the side plates, a stud having right and left hand threads on opposite ends thereof threaded through the pins of the brackets, and means rotating the stud.

5. In a brake, the combination which comprises a rotor having a peripheral channel therein, balls positioned in said channel, stationary side plates positioned against the sides of the rotor, shoes having arcuate inner surfaces pivotally mounted in the side plates and positioned to engage the balls of the rotor, springs resiliently urging the shoes away from the balls, an outer ring with cams on the inner surface freely mounted between the side plates with the cams on the inner surface positioned to engage the outer surfaces of the shoes, means mounting the springs, for holding the shoes away from the balls, in the outer ring, brackets extended outwardly from the side plates, a pin carried by the outer ends of the brackets of the side plates, a bracket positioned on the outer ring, a pin carried by the bracket of the outer ring and positioned to coact with the pins carried by the brackets of the side plates, a stud having right and left hand threads on opposite ends thereof threaded through the pins of the brackets, and means rotating the stud.

References Cited in the file of this patent

UNITED STATES PATENTS

| Number | Name | Date |
| --- | --- | --- |
| 1,433,220 | Nickum | Oct. 24, 1922 |
| 1,724,983 | Weiss | Aug. 20, 1929 |
| 2,061,209 | Porter | Nov. 17, 1936 |

FOREIGN PATENTS

| Number | Country | Date |
| --- | --- | --- |
| 700,785 | France | Mar. 6, 1931 |